(12) United States Patent
White et al.

(10) Patent No.: US 12,156,300 B2
(45) Date of Patent: Nov. 26, 2024

(54) TEMPERATURE CONTROL SYSTEM

(71) Applicant: WARMUP PLC, London (GB)

(72) Inventors: Antony J. White, Torquay (GB); Spencer D. Sheen, Charlottetown (CA)

(73) Assignee: Warmup PLC, London (GB)

( * ) Notice: Subject to any disclaimer, the term of this patent is extended or adjusted under 35 U.S.C. 154(b) by 448 days.

(21) Appl. No.: 16/937,893

(22) Filed: Jul. 24, 2020

(65) Prior Publication Data

US 2021/0029782 A1   Jan. 28, 2021

(30) Foreign Application Priority Data

Jul. 26, 2019   (GB) ...................................... 1910739

(51) Int. Cl.
*H05B 3/06* (2006.01)
*F24D 13/02* (2006.01)

(52) U.S. Cl.
CPC ............... *H05B 3/06* (2013.01); *F24D 13/02* (2013.01)

(58) Field of Classification Search
CPC .................................. F24D 13/02; H05B 3/06
See application file for complete search history.

(56) References Cited

U.S. PATENT DOCUMENTS

| | | | | |
|---|---|---|---|---|
| 4,250,674 A | * | 2/1981 | Feist | ........................ E04B 5/48 D25/138 |
| D541,396 S | | 4/2007 | Fawcett et al. | |
| 8,176,694 B2 | | 5/2012 | Batori | |
| 2009/0217605 A1 | | 9/2009 | Batori | |
| 2009/0230113 A1 | | 9/2009 | Batori | |

(Continued)

FOREIGN PATENT DOCUMENTS

| | | | |
|---|---|---|---|
| CH | 628700 A5 * | 3/1982 | ............. B29C 51/36 |
| DE | 2720361 A1 | 11/1978 | |

(Continued)

OTHER PUBLICATIONS

Search Report under Section 17(5) for United Kingdom Patent Application No. GB1910739.0 mailed Dec. 12, 2019, 7 pages.

(Continued)

*Primary Examiner* — Nathaniel E Wiehe
*Assistant Examiner* — Keith Brian Assante
(74) *Attorney, Agent, or Firm* — Sheppard, Mullin, Richter & Hampton LLP

(57) ABSTRACT

A support structure for a heating or cooling system comprises a base; and a plurality of projections that extend from said base and are capable of retaining one or more thermal elements positioned adjacent thereto; wherein each of said projections comprises a wall extending from said base, at least part of said wall having an oscillating form to increase the crush resistance of the support structure. During installation, many potential sources of pressure that can crush and/or damage the structure. For example, an installer may stand on the structure while inserting the thermal elements, or heavy equipment may apply a concentrated load upon the structure. The walls of the structure are largely responsible for crush resistance of the structure, wherein an oscillating wall has an effective thickness greater than its actual thickness and enhances crush resistance of the structure without a large increase in material.

18 Claims, 10 Drawing Sheets

(56) References Cited

U.S. PATENT DOCUMENTS

| | | | |
|---|---|---|---|
| 2018/0017269 A1* | 1/2018 | Houle | F24D 13/02 |
| 2018/0051893 A1* | 2/2018 | Bordin | E04B 5/48 |
| 2019/0226686 A1 | 7/2019 | White et al. | |
| 2020/0191413 A1* | 6/2020 | Faotto | E04F 13/072 |

FOREIGN PATENT DOCUMENTS

| | | |
|---|---|---|
| DE | 3015961 A1 | 11/1981 |
| EP | 0097653 A1 | 1/1984 |
| EP | 0637720 A1 | 2/1995 |
| GB | 744931 A | 2/1956 |
| GB | 2046397 A | 11/1980 |
| GB | 2570639 A | 8/2019 |

OTHER PUBLICATIONS

Examination Report under Section 18(3) for United Kingdom Patent Application No. GB1910739.0 mailed Aug. 16, 2022, 6 pages.

Extended European Search Report for European Patent Application No. 20187981.4 mailed Dec. 23, 2020, 11 pages.

Examination Report under Section 18(3) for United Kingdom Patent Application No. GB1910739.0 mailed Jan. 16, 2023, 5 pages.

\* cited by examiner

TEMPERATURE CONTROL SYSTEM

This application claims priority to United Kingdom Patent Application No. 1910739 filed on Jul. 26, 2019, wherein the entire contents of the foregoing application are hereby incorporated by reference herein.

The invention relates to heating and cooling systems for use within floors, walls or ceilings of buildings. In particular it may relate to underfloor heating systems in which heating is provided by heating cables or pipes fitted to a mat or panel.

Heating and cooling systems which use the floor, wall or ceiling surface as the heat exchange surface require either an embedded heat source or heat sink, commonly in the form of electrically resistive heating cables, or an embedded distribution system of pipes carrying a fluid or gas, that has been either heated or cooled by a connected heat source or heat sink. These may hereafter be referred to as the thermal element(s). While a plurality of thermal elements may be used, it is common for a single thermal element (e.g., a single cable or a single pipe) to be used. A single thermal element is typically laid in a serpentine fashion on the floor so as to distribute its heating or cooling as evenly as possible.

To ensure a regular temperature distribution of the emitting surface, it is important to space the thermal element at equidistant intervals, e.g., by looping back and forth across the emitter area.

The act of heating and/or cooling these exposed surfaces produces shear stress coplanar to the isotherms, created by the thermal element while it is active. This sheer stress can cause mechanical failure of the construction if it exceeds the limits of any individual material or bond within the system construction.

Some underfloor heating installations employ an intermediate structure fitted between a main floor and a sub-floor. The main floor is the upper structure that is presented to the user and is typically a decorative floor layer, e.g., tiles, solid wood, laminate, etc.

The sub-floor is the main structural floor of the building and is typically either concrete or wood. The intermediate structure provides support for the main floor as well as providing protection for the wires or pipes which are laid therein (e.g., protection from footfall during installation and protection from crushing after installation).

While the remainder of this document discusses underfloor heating systems, it will be appreciated that the principles discussed apply equally to installations in other surfaces such as walls and ceilings. Also, fluid based systems that achieve heat exchange by flowing a liquid (typically water) through pipes can be used for cooling as well as heating. It will be appreciated that while the remainder of this document is more focused on heating installations, the principles also apply equally to cooling systems.

Heating and cooling systems, whether electrical or hydronic (water based), need to accommodate expansion and contraction of the various structural elements of the installation. Such movement may be due to temperature variations (e.g., during start-up and cool-down of the heating elements) or due to drying out of structures after installation (e.g., drying of concrete or timber leads to shrinkage). The main area of stress in a traditional installation is between the sub-floor and the intermediate structure as this is typically where the greatest temperature difference occurs due to contact with the ground (or other surfaces), and is also where contraction due to drying will occur. Thermal stresses are dependent on the temperatures, thermal conductivities and thermal expansion coefficients.

The intermediate layer, or support layer is often provided in the form of one or more mats that can be rolled out or tiled over the underlying subfloor. The support layer typically has a plurality of projections designed to be capable of retaining one or more thermal elements positioned adjacent thereto. Such structures are often referred to as castellated structures. The projections or castellations typically form a series of pillars around or between which the thermal elements are threaded, the projections providing support to hold the thermal elements in position along straight runs, but also providing support for changes of direction by winding around the projections (e.g., a 90 degree wind to change to a perpendicular direction). The projections may be spaced such that they grip the thermal elements firmly to prevent lateral as well as vertical movement, thus holding them securely in place during installation. Alternatively, the projections may be spaced sufficiently far apart that they do not laterally squeeze the thermal elements, but instead have a protuberance at the distal end of the projection that extends over the thermal elements in use and prevents them from riding up the side of the projection and potentially losing their positioning. Two such projections with protuberances may be positioned a distance apart that they will not grip the thermal elements when installed, but have their protuberances facing each other such that the distance between protuberances is less than the diameter of the thermal element. Thus the thermal elements may be squeezed or snapped into position between the projections, but will not easily squeeze back out.

According to a first aspect, the invention provides a support structure for a heating or cooling system, comprising:
 a base; and
 a plurality of projections extending from said base, said projections being capable of retaining one or more thermal elements positioned adjacent thereto;
 wherein each of said projections comprises a wall extending from said base, at least part of said wall having an oscillating form.

According to a second aspect, the invention provides a method of forming a support structure for a heating or cooling system, comprising:
 forming a plurality of projections on a base, the projections being capable of retaining one or more thermal elements positioned adjacent thereto;
 wherein each of said projections comprises a wall extending from said base, at least part of said wall having an oscillating form.

Forming the wall that extends from the base such that it has an oscillating form increases the crush resistance of the support structure. During installation, there are many potential sources of pressure that can crush and/or damage the structure. For example, the installer will typically stand or kneel on the structure while inserting the thermal elements (e.g., heating wires or conduits) between the projections. Additionally, other heavy equipment may be placed upon the structure and if its load is applied through a small area, the pressure on individual projections of the structure can be quite large. The crush resistance of the structure comes largely from the walls of the projections that extend from the base. The thicker the walls are, the better they are at resisting crushing forces. However, thick walls can be hard to form and are inefficient in terms of the amount of material required to gain additional crush resistance. Instead, the oscillating wall provides a wall which has an effective thickness greater than its actual thickness and which increases the crush resistance of the structure without a large increase in material.

It will be appreciated that the walls of the projections typically extend out from the base at an angle that is substantially perpendicular to the base. This provides maximum strength against crushing forces which generally act substantially perpendicular to the base. However, some small deviations from vertical may be possible while still gaining the benefits of the invention.

The oscillating form of the wall may take any suitable form. For example, the oscillations need not by symmetrical or regular, but rather may be asymmetrical or irregular. For example, the oscillations may be of different sizes and of different shapes while still increasing the average effective thickness of the wall and thus increasing the overall crush resistance of the structure.

In some preferred embodiments the oscillating form comprises a sequence of changes of directions. For example, the oscillating form may follow a sequence of left turns and right turns that results in the oscillating form. In one example, the sequence of left and right turns could be a repeating sequence of two left turns followed by two right turns. Where such turns are right angles, this forms a square wave pattern. In some embodiments the oscillating form may comprise a sequence of alternating directions. Such a sequence may be a repeating sequence of alternating a single left turn followed by a single right turn. Such a sequence forms a zigzag or concertinaed wall, or a triangular (or saw tooth) waveform.

It will be appreciated that the number of turns in the sequence can vary and the exact nature of the sequence can vary. For example, the sequence of turns may be substantially repeating, but with one or more additional turns inserted into the sequence to affect the overall direction and shape of the wall. For example, a zigzag pattern with an additional turn in the middle can cause a change of direction in a wall that otherwise has a generally singular direction. Equally, the angle of the turns can be varied to achieve the same effect and thus shape the wall.

It will also be appreciated that the turns may be smooth turns, i.e. curves so as to form a smooth undulating waveform without discontinuities in its gradient. However, sharp turns (corners) are preferred for maximally increasing the effective width of the wall.

Each change in direction of the wall adds to the complexity of its form and thus adds to the overall length, effective thickness and strength. Therefore, for better strength, it is preferred to have several changes in direction in the wall. In some embodiments the sequence comprises at least 4 changes in direction. In other embodiments the sequence comprises at least 6 changes, more preferably at least 8 changes in direction. In other examples the sequence may comprise at least 10, 12, 14 or 16 changes in direction. The number of changes of direction in the wall may be limited by the available space and the available material. However, in larger structures the number of changes of direction could be much greater than 16, for example over 20, 30 or 40. However, at least in smaller structures, the number of changes in direction may be kept low in order to minimize the complexity of the shape. After a desired crush resistance has been achieved, adding complexity only adds to the manufacturing difficulty and reduces the production yield.

The changes of direction may occur at sharp corners. For example the changes of direction may form cusps such that they essentially form a discontinuity in the smoothness of the wall shape, i.e. the wall has two distinct tangents at the corner. Of course it will be appreciated that manufacturing techniques will not permit perfectly sharp corners, but any radius of curvature in a "sharp" corner is preferably small compared with the length of wall between any two such corners. In certain examples, the radius of curvature at the corners is preferably less than 0.5 mm.

The angles of the changes of direction can vary greatly while still achieving the benefits of the invention. For example, varying the angle can change the wall shape from a highly folded concertina shape to a much more open, flattened concertina shape. In some embodiments each change of direction may be at least 60 degrees, preferably at least 75 degrees. The higher angle turns increase the effective width which in turn provides increased strength. If the angle of the changes of direction is very high then manufacturing becomes difficult (could result in tearing during forming) and the amount of material required increases a lot compared with the smaller increase in strength. Therefore, in some embodiments each change of direction is no more than 120 degrees, preferably no more than 105 degrees. In some examples, the angle is between 100 degrees and 110 degrees, nominally around 90 degrees. Again, it will be appreciated that the changes of direction do not all have to be the same. For example, two or more different angles can be combined in the sequence to form more complex projection shapes.

The projections could have any overall shape. For example, the projections may be square or rectangular, circular or elliptical. However, in some embodiments each projection has an overall curved shape or arcuate shape and at least a portion of the wall on the inside of the curved or arcuate shape has the oscillating form. The curved shape may be substantially a C-shape (or U-shape, or a shape similar to a parenthesis, banana or boomerang), i.e. formed from a convex outer surface facing away from a central region and a concave inner surface facing the central region. Forming the oscillating wall shape on the inside of the curved shape, i.e. on the concave surface, is beneficial as this surface may be arranged as a surface that does not contact the thermal elements in use. This can be useful as a visual indicator to the installer, with the smoother surfaces indicating more clearly where the thermal elements go, while the more complex oscillating wall identifies regions not intended for laying thermal elements. Accordingly, in some preferred embodiments the wall of each projection may be smooth on the surface that may contact the one or more thermal elements. In the embodiments discussed above, this surface that contacts the thermal elements may be the outer, convex surface of the curved projection.

It will be appreciated that the structure, including the base and projections can be formed in any of a number of different ways. For example, it may be formed by attaching projections to the base, but is preferably formed by an integral moulding or forming technique. For example, the structure may be formed by moulding or by etching or machining the projections out of a material blank. However, in some preferred embodiments the support structure is formed by vacuum forming a sheet of suitable material.

The plurality of projections may be positioned so as to form a first set of substantially parallel undulating channels, each channel having one of said projections forming at least a part of the inner radius of each undulation; and wherein each projection has a recess formed in a side wall thereof facing said channel.

The undulations of the channel ensure that a thermal element positioned in the channel will make contact with the projections each time it has to bend around one, while not requiring the spacing of the projections to squeeze the thermal element. Thus the thermal element can be held securely without any play (unwanted lateral movement) in a channel that is slightly wider than the thermal element. The recesses in the channels at the contact points also restrict movement in the vertical direction, thus preventing the thermal element from 'popping out' of the channel, while not requiring any restriction narrower than the thermal element. In a traditional installation, the snap-fit mechanism uses an opening narrower than the thermal element so that the thermal element deforms to pass through the opening, then elastically returns to its normal shape and size once in the channel. By contrast, with this arrangement of undulating channels, the recesses are spaced along the channel so that the thermal element is only retained by one recess at any particular point along its length. Moreover, the undulations of the channel (and thus of the thermal element within the channel) cause the thermal element to be held within the recess (and thus retained within the channel, prevented from popping out) by the natural tension of the thermal element without having to be passed through a restriction that causes deformation. This has the benefits of easing the laying of the thermal elements (less force required to push it into the channel) and less wear on the thermal element by deformation (leading to longer service life). While this wear has not generally been considered to be an issue to date, reducing or removing this installation stress should increase the service life of the product by increasing the average time to failure. As repairs can be quite disruptive, the service life is an important feature of any such system.

It will be appreciated that the recess on the projection on the inner radius of the channel may be the only recess present at that location along the channel, i.e. it is preferred that there is no recess on a projection immediately opposite, facing the channel on its outer radius (i.e. facing the outside of the curve or undulation). While the presence of such a recess is not problematic, there is no need for it as the thermal element is held in contact with the projection on its inner radius and thus held within the recess there without further aid. Particularly as the channel is preferably slightly wider than the thermal element, the outer radius on an undulation of the thermal element would not come into contact with any projection present there.

The recess is preferably a dent or notch or hollow in the otherwise substantially vertical side wall of the projection. The side wall is preferably vertical for structural reasons (it is normally designed to support the weight of an installer walking on the mat, i.e. on the projections). Forming a dent or notch or hollow in the middle of the side wall (rather than for example forming an overhang at the top of the projection) is robust, retaining the structural strength of the projection (by contrast an overhang at the top may be bent or broken easily).

The undulating channels may alternatively be termed 'wavy' channels. The undulations are essentially curved zigzags back and forth from one side to the other, i.e. the channel may be considered to be formed from a series of curves in alternating directions. The curves are preferably of relatively large radius, i.e. gentle curves rather than tight curves so as to place minimal stress on the thermal elements. A large radius of curvature may be considered to be larger than the diameter of the thermal element (thus larger than the width of the channel), preferably much larger, e.g., the radius of curvature may be greater than 5 times or 10 times the diameter of the thermal element (or the width of the channel).

Preferably the projections also form a second set of undulating channels, each channel having one of said projections forming at least a part of the inner radius of each undulation. The first set of undulating channels may be substantially perpendicular to the second set of undulating channels. Such a regular array or grid of channels is useful for laying the thermal elements therein in a pattern that achieves good coverage of the surface (e.g., floor) so as to provide good even heating or cooling of the surface across the required area. Preferably the first and second sets of undulating channels together encompass a regular rectangular grid. In other words a rectangular grid (a virtual one) could be drawn entirely within the channels (including both the first and second sets) without intersecting any of the projections, the grid being rectangular and regular, for example a square grid in particularly preferred symmetrical embodiments. This requirement places a restriction on the amount of undulation in the channels as the amplitude of the undulations cannot exceed the width of the channel without crossing (blocking) the virtual grid. It also places an overall straightness restriction on the channels such that on average they follow the straight lines of the grid. This is convenient for regular patterns of laying thermal elements and is useful for matching the geometry of most rooms (most rooms being generally rectangular or at least with perpendicular walls. It will also be appreciated that the amplitude of the undulations is preferably greater than the difference between the width of the channel and the diameter of the thermal element as if this is not the case then the thermal element may not be constrained to undulate with the channel but could instead take a straight path down the middle, avoiding contact with the projections. It is further preferred that the amplitude of the undulations is less than 30% of the wavelength of the undulations, more preferably less than 10% of the wavelength of the undulations. This ensures that the increase in the required length of thermal element per unit length of the support structure is kept low. For example, with the amplitude less than 30% of the wavelength, the installed length of thermal element is no more than 1.05 meters per meter of support structure (assuming a straight run of thermal element). With the amplitude less than 10% of the wavelength, the installed length can be kept to no more than 1.005 meters per meter of support structure.

The channel may be sized appropriately for any suitable thermal elements. For example electrical heating wires may be narrower than fluid-carrying conduits (hoses or pipes) and the structure can be designed and sized appropriately for different thermal elements. In some particularly preferred embodiments the channel is sized to accommodate a thermal element with a diameter at least 2 mm.

It is preferred to design the projections and the channels for minimal contact between the projections and the thermal element beyond what is required for retaining the thermal element securely. In use, after the thermal element has been laid in the channels, an adhesive compound (e.g., a tile adhesive) is poured aver the structure so as to fill the gaps in the channels and surround the thermal element and thereby assist in conduction and distribution of heat from the thermal element to the overlying surface. The projections are typically hollow (typically moulded or vacuum formed) and thus do not contain a heat conductive substance and instead provide an insulating volume. Therefore contact between the thermal element and the projection is preferably minimized so as to improve overall heat conduction.

It is possible for a large projection to extend between adjacent channels and to have two recesses, one on each of two opposite sides (or indeed four recesses on four sides, each facing one channel). However such large projections can result in large areas without thermally conductive filler (e.g., tile adhesive) and thus can negatively impact thermal distribution. Therefore in preferred embodiments the projections are grouped into pairs, the recesses of the two projections facing adjacent undulating channels of either the first set of channels or the second set of channels. Each pair of projections is preferably two distinct projections with a gap between them through which filler material can flow and through which thermal energy can be transmitted so as to improve thermal distribution to the areas between adjacent channels (i.e. intermediate between two thermal elements).

In some preferred embodiments each projection of the pair is formed as a curve, the two curves partially surrounding a central space. The outer radius of each curved projection then forms the inner radius of the undulating channel. Therefore the recess is preferably formed in that outer radius to from the contact point and retaining means for a thermal element placed in the channel.

The shape of the projections has a particular benefit that in use they make essentially (or very close to) point contact with the thermal element(s) while the thermal elements are running in one of the aforementioned channels. A greater contact area will only result when a thermal element winds around a projection when changing direction (e.g., at a 90 degree bend). This reduction in contact area between the thermal elements and the support structure results in a greater area of contact between the thermal elements and thermally conductive filler that is subsequently provided around the thermal elements, e.g., adhesive or leveling compound. The thermally conductive filler conducts heat much more efficiently across the installation than material of the support structure and therefore this arrangement results in better heat transfer, fewer hot spots and cold spots, lower thermal gradients and thus lower stresses within the structure.

The open and regular grid arrangement of channels together with the low contact area achieved with the projections also ensures that there are many easy heat flow paths for heat to be conducted around the structure. The channels that are not used to accommodate thermal elements instead provide heat conduction paths around the structure.

In order to form the undulations of the channels, each pair of projections preferably forms a structure that is wider in one dimension that separates two inner channel diameters than it is in a perpendicular dimension that separates two outer channel diameters. The combined structure of the pair thus forms a bulge around which two undulating channels curve in a mirror-image manner. It will be appreciated that in other embodiments the combined structure of the pairs could be generally circular (forming two arcs of a circle, thereby still allowing thermal distribution to the middle).

Alternating large radius circles and small radius circles in a chequerboard pattern could be used to form the undulating channels. However, it is preferred that the same sized projections are used throughout, i.e. that each pair of projections has essentially the same shape.

Thus in some particularly preferred embodiments each pair of projections can have one of two orientations, one orientation being a ninety degree rotation of the other orientation, and wherein the pairs are arranged on the support structure in a rectangular grid with the orientations set according to a chequerboard pattern. With this arrangement, and in particular with the generally elliptical or bulging shape described above, the same size and shape can be used for all pairs of projections, with only the orientation changing. This makes for an even pattern with more uniform thermal distribution across the whole surface (e.g., across a whole floor).

In some preferred embodiments, the support structure for a heating or cooling system may comprise: a viscous layer provided on a side of the support structure opposite to the projections. The viscous layer is preferably at least 0.15 mm thick. The viscous layer provides the contact between the support structure and the underlying substrate (e.g., the sub-floor in the case of an underfloor heating or cooling system) and transposes some of the elastic stress within the system's construction that could otherwise cause a mechanical failure, to a viscous stress and strain within the viscous layer.

According to another aspect, the invention provides a support structure for a heating or cooling system, comprising:
 a base; and
 a plurality of projections extending from said base, said projections being capable of retaining one or more thermal elements positioned adjacent thereto;
 wherein the plurality of projections are positioned so as to form a first set of substantially parallel undulating channels, each channel having one of said projections forming at least a part of the inner radius of each undulation; and
 wherein each projection has a recess formed in a side wall thereof facing said channel; and
 wherein each recess comprises two locating edges parallel to the channel and separated by a distance which is less than half the height of the projection.

According to another aspect, the invention provides a method of forming a support structure for a heating or cooling system, comprising:
 forming a base; and
 forming a plurality of projections extending from said base, said projections being capable of retaining one or more thermal elements positioned adjacent thereto;
 wherein the plurality of projections are positioned so as to form a first set of substantially parallel undulating channels, each channel having one of said projections forming at least a part of the inner radius of each undulation; and
 wherein each projection has a recess formed in a side wall thereof facing said channel; and
 wherein each recess comprises two locating edges parallel to the channel and separated by a distance which is less than half the height of the projection.

The recess serves to retain the thermal element be restricting its upward movement (away from the base), while not pinching the thermal element and not requiring the thermal element to be pinched at any time during its placement (as the width of the undulating channel can be formed wider than the thermal element). The locating edges provide a certain feedback sensation to the user as the thermal element locates into the recess, contacting both edges and thus defining its position relative to the projection. Along its length, the thermal element will be located in many such recesses, thus holding it in place in the support structure. The height of the recess (i.e. the separation of the locating edges in the direction perpendicular to the base) determines how much of the thermal element lies within the recess and also determines the feel of the locating feedback. For example, a recess with a large height (i.e. a large separation between the locating edges) will accommodate a larger portion of the cross-section of the thermal element. Thus the thermal element will overlap deeper into the projection and will locate more firmly within the recess, giving a stronger feedback sensation. Further, the deeper overlap means that the thermal element is more firmly held within the structure as it would have to move further away from the projection to escape from being retained. It will be appreciated that the amount of thermal element that is received in the recess is determined not only by the height of the recess, but also by the diameter of the thermal element. For example, for a given recess height, a smaller diameter thermal element will sit deeper within the recess than a larger diameter thermal element. Thermal elements are typically dimensioned to correspond reasonably closely to the height of the projections as the projections are provided at least partly to protect the thermal elements (and so should ideally extend slightly above the thermal elements) while also adding to the overall height of the installation (and should therefore normally be minimized to keep the installation height small).

The invention recognizes that a recess height (separation of locating edges) of less than half the height of the projection is particularly advantageous as such dimensions are still capable of providing a good solid retention of thermal elements with a size close to the height of the projections and a good locating feel to the connection, while also reducing the impact on the strength of the projections. A smaller height recess weakens the projections less as it does not need to have such a great depth in order to accommodate the thermal elements and thus does not impact so much on the strength of the projection wall in which it is formed.

In some particularly preferred embodiments the locating edges are separated by a distance which is less than 40% of the height of the projection.

The depth of the recess is preferably sufficient to accommodate a thermal element which has a diameter in the range from the height of the projection to 20% less than the height of the projection without the thermal element contacting a rear wall of the recess. As discussed above, the amount of thermal element that can be accommodated between two locating edges of a given separation depends on the diameter of the thermal element. Also, as discussed above, the depth of the recess affects the strength of the wall in which it is formed, and should therefore ideally be minimized. However, in order to get a good retaining and locating contact between the thermal element and the locating edges, the recess must be deep enough that the thermal element will not come into contact with the back of the recess. This depth can be calculated according to the recess height and the thermal element diameter. However, manufacturing tolerances can result in thermal elements not always being of uniform diameter. Therefore, the recess preferably allows for some variation in the diameter of the thermal element by having a recess depth that is large enough to accommodate the most extreme expected variation. A variation in diameter of 20% has been found to cover the majority of manufacturing variations.

The particular sizes of projections and diameters of thermal elements can vary a great deal depending on installation type and purpose. For example, heating wires are generally fairly thin (diameter in the region of 4-5 mm) while hydronic heating conduits may be much wider (diameter in the region of 10-20 mm). In some particular embodiments, especially those using electrical heating wires, the recess may have a height of less than 2 mm and a depth of no more than 0.3 mm, preferably no more than 0.25 mm. For a typical thermal wire diameter of 4.5 mm, the projections may be formed to be 5 mm high (or even slightly higher) so as to accommodate up to a 10% larger wire (due to manufacturing variations).

The recess height of 2 mm is thus less than half the height of the projections and has been found to provide good location and retention of the thermal wires. Even if the thermal wire diameter is up to 10% narrower than design (i.e. down to 4 mm), the recess depth of 0.25 mm can still accommodate the portion of the thermal wire that sits within the recess without contacting the rear wall of the recess. Scaling up for larger thermal elements (e.g., larger heating wires or hydronic conduits), the recess may have a height of less than 40% of the height of the projection and a depth of no more than 6%, preferably no more than 5% of the height of the projection.

According to another aspect of the invention, there is provided a support structure for a heating or cooling system, comprising:
 a base; and
 a first plurality of projections extending from said base, said projections being capable of retaining one or more thermal elements positioned adjacent thereto; and
 a second plurality of projections extending from said base and not being capable of retaining thermal elements, each of said second plurality of projections having a wall that at least partially overhangs the base.

According to another aspect, the invention provides a method of forming a support structure for a heating or cooling system, comprising:
 forming a base;
 forming a first plurality of projections extending from said base, said projections being capable of retaining one or more thermal elements positioned adjacent thereto; and
 forming a second plurality of projections extending from said base and not being capable of retaining thermal elements, each of said second plurality of projections having a wall that at least partially overhangs the base.

The second plurality of projections provides an anchor by which to ensure that the support structure can be firmly bonded to an overlying adhesive layer. Such an adhesive layer is typically a liquid or slurry poured over the support structure after laying of the thermal elements. The liquid adhesive flows around the first and second pluralities of projections (and the thermal elements) and sets solid, forming a heat transfer medium to conduct heat to/from the thermal elements and also providing a level surface on which further surfaces can be laid, e.g., tiles. During use, the temperature changes in the adhesive layer cause differential expansion and contraction between the adhesive layer and the overlying structure (e.g., tiles) and underlying support structure. If there is not a firm bond between the two then separation may occur leading to failure of the whole installation. The second projections serve to anchor the adhesive layer to the support structure by partially overhanging the base of the support structure. Thus, when the adhesive layer flows around the second projections, it flows and sets under the overhang and thus provides a mechanical interlock between the adhesive layer and the support structure that can resist any thermal expansion and contraction and prevent separation of the two structures. As this functionality is provided by a second plurality of projections, separate from the first plurality of projections, the first plurality of projections do not need to provide any significant mechanical interlock with the adhesive layer. This allows the first plurality of projections to be shaped optimally for routing and retaining the thermal elements without additional concerns about interlocking with the adhesive. This allows for more efficient contacting of the first plurality of projections with the thermal elements and easier mounting of the thermal elements within the support structure.

In preferred embodiments an outer wall of each projection of the second plurality of projections at least partially overhangs the base. The second plurality of projections extends out from the base such that they have a perimeter wall extending upwardly from the base (which may be sloped or substantially perpendicular to the base). The radially outer perimeter wall overhanging the base (i.e. with the wall projecting radially outwardly from the center of the projection) provides a mechanical interlock with the region of the support structure lying between and around the projections.

The second plurality of projections can be formed with a substantially planar top (or a domed top), but in some preferred examples the second plurality of projections may each be formed as a ring and the internal wall of the ring partially overhangs the base. When the second projection is formed as a ring, a cavity is formed within the projection such that a quantity of adhesive projects down into the cavity and sets therein. When the internal wall (i.e. the radially inwardly facing wall, facing the center of the projection and the cavity) overhangs the base, the same mechanical interlock effect is achieved as is discussed above, except that the interlock is formed with the cavities of the support structure internal to the second plurality of projections.

It will be appreciated that the two interlock structures described above may be used individually or in combination. Either is sufficient on its own to provide the required interlock (i.e. only the external wall overhang or only the internal wall overhang), but both internal and external overhanging walls can be provided on the same projections. Equally some projections could be formed with an internal overhang, and some with an external overhang, or indeed some with both overhangs.

The overhang could be formed part way up the wall, e.g., at a mid-height thereof, e.g., by forming a bump or lip or ring in the wall. However, in order to accommodate more adhesive underneath the overhang it is preferred that the overhang is formed by an extension formed at an end of the wall distal from the base. The wall may be substantially perpendicular to the base with an overhanging extension formed at the end distal from the base.

The locations of the second plurality of projections in relation to the first plurality of projections can be selected according to many design styles. However, in some particularly preferred embodiments the first plurality of projections are grouped into pairs, each projection being curved in shape; each projection of the pair having a convex side and a concave side and arranged such that the concave sides face each other; wherein the convex sides of the first plurality of projections in a pair are arranged for engagement with thermal elements; and a second projection is located between the concave sides of the pair. An advantage of this arrangement is that the second plurality of projections serve a secondary purpose before the adhesive has been applied as they provide a visual indicator to the installer that the region that is in between the pair of first projections is not intended for laying thermal elements. This avoids erroneous laying of thermal elements through channels that are not intended for them.

The second plurality of projections could have a height similar or identical to that of the first plurality of projections. This may be advantageous for providing a better interlock and/or may be more convenient to manufacture. However, in some preferred embodiments the first projections have a height greater than the second projections. The first projections may have a height at least twice that of the second projections. In particular, as the second projections are not for retaining the thermal elements, having a smaller height adds a further visual indication that those projections are not suitable for winding the thermal elements around. At the same time, the second projections can still provide adequate mechanical interlock, while providing less obstruction to the thermal conductivity of the overall installation, thus allowing for more even temperature distribution in the overlying structure.

According to another aspect, the invention provides a support structure for a heating or cooling system, comprising:
 a base; and
 a plurality of projections extending from said base, said projections being capable of retaining one or more thermal elements positioned adjacent thereto;
 wherein the plurality of projections are grouped into pairs, each projection being curved in shape; each projection of the pair having a convex side and a concave side and arranged such that the concave sides face each other;
 wherein the convex sides of the projections in a pair are substantially smoothly curved and arranged for engagement with thermal elements; and
 wherein the concave side of each projection consists of two straight walls meeting at a corner.

According to another aspect, the invention provides a method of forming a support structure for a heating or cooling system, comprising:
 forming a base;
 forming a first plurality of projections extending from said base, said projections being capable of retaining one or more thermal elements positioned adjacent thereto; and
 forming a second plurality of projections extending from said base and not being capable of retaining thermal elements, each of said second plurality of projections having a wall that at least partially overhangs the base.

This arrangement of projections shares many of the benefits discussed above. For example, the smoothly curved convex outer sides of the projections are clearly identifiable as being for engagement with the thermal elements, while the straight walled concave sides are readily identifiable as being a region not intended for thermal element contact. This avoids erroneous laying of the thermal elements. At the same time, the straight sided concave sides are easy to manufacture and the corner formation adds to the overall wall strength and thus crush-resistance of the structure. The pair of projections can of course have a second projection formed in between them as discussed above for forming a mechanical interlock with the overlying adhesive layer.

Preferred embodiments of the invention will be described, by way of example only, and with reference to the accompanying drawings in which.

Figure 1:
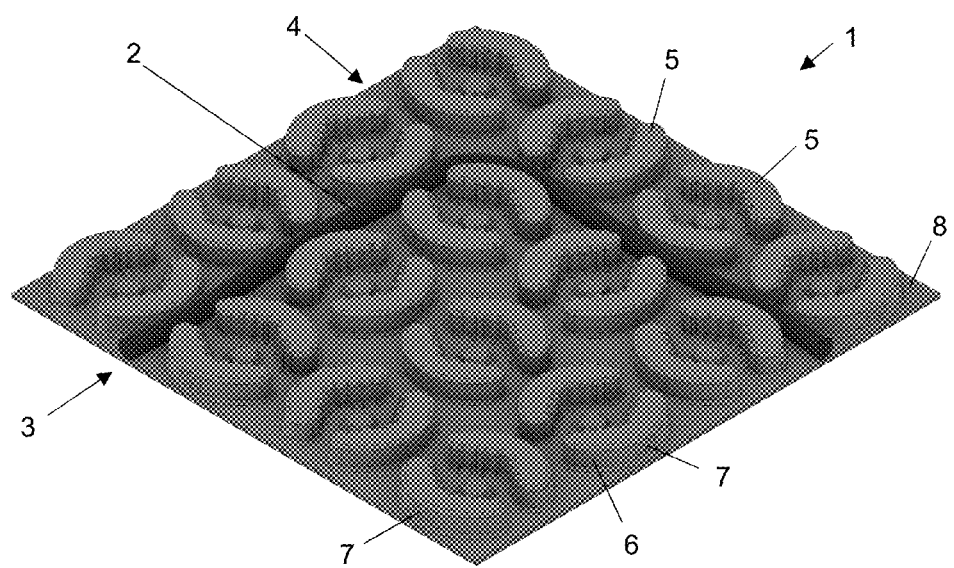
FIG. 1 shows a perspective view of a first embodiment of a castellated mat support structure.
Figure 2:
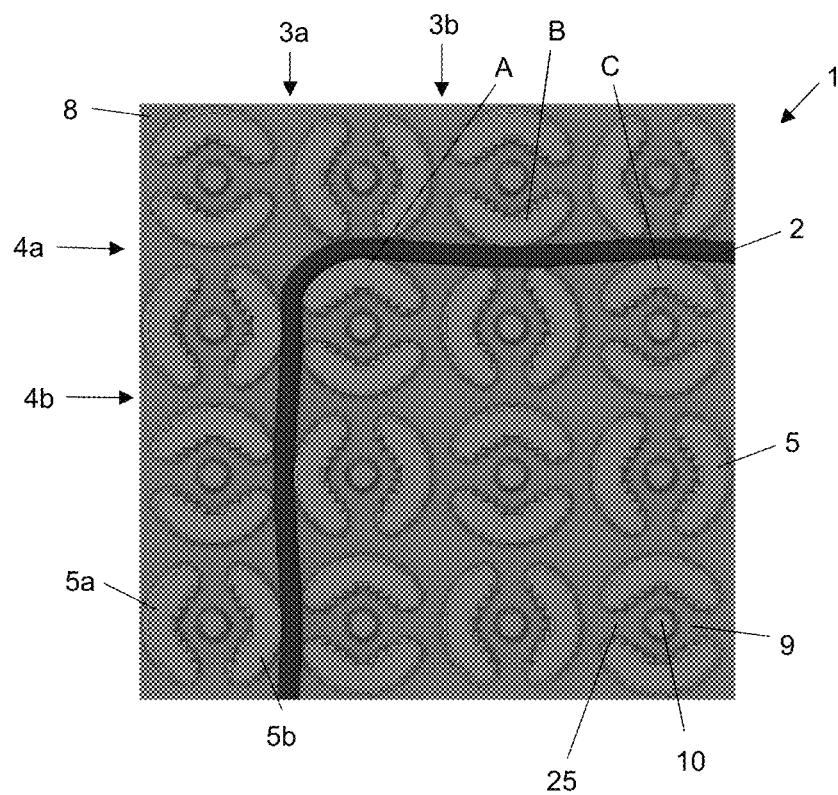
FIG. 2 shows a plan view of the mat of FIG. 1.
Figure 3:
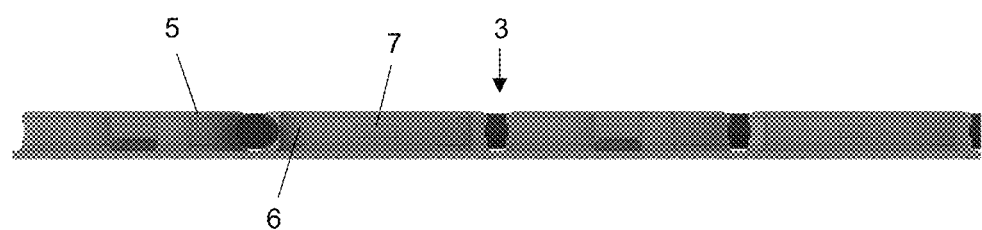
FIG. 3 shows a side view of the mat of FIG. 1.

FIGS. 1-3 show a first embodiment of a castellated support structure 1 in the form of a mat. The mat may take the form of sheets that can be laid adjacent to one another or a roll that can be rolled out onto a desired surface. Either way the mat can be cut to size and shape for any particular installation.

The mat 1 is typically used as an intermediate structure in underfloor heating installations and provides a structure around which a heating element 2 can be wound while holding the heating element 2 in place. The mat 1 also provides a rigid structure that can protect the heating element 2 from being damaged, e.g., crushed during installation by installers walking around on the mat 1.

In some preferred embodiments, the support structure 1 may have a viscous layer provided on an underside thereof, i.e. a side of the support structure opposite to the projections or castellations 5. The viscous layer is preferably at least 0.15 mm thick and provides the contact between the underside of the support structure and the underlying substrate (e.g., the sub-floor in the case of an underfloor heating or cooling system). The viscous layer transposes some of the elastic stress within the system's construction that could otherwise cause a mechanical failure, to a viscous stress and strain within the viscous layer.

While the remainder of this description discusses a heating element in an underfloor heating installation, it will be appreciated that the mat is equally useful for a cooling element such as a conduit to carry a cold fluid and absorb heat from the room. It will also be appreciated that the installation is not limited to floors, but could equally well be installed on a wall or ceiling. It will also be appreciated that underfloor heating systems can either be fluid-based (often termed hydronic) in which a hot liquid is pumped through a fluid carrying conduit, or electrical in which an electrical current is passed through a heating wire to generate heat. The mat 1 can be used for any of these installations. The heating conduit, cooling conduit or heating wire are generally referred to as a thermal element 2.

FIG. 1 shows a support structure (mat) 1 with a thermal element (an electrical heating wire in this particular embodiment) 2 which is flexible and which has been laid in channels 3, 4 which are formed between projections 5. The projections 5 have a side wall 6 with a height greater than the diameter of the thermal element 2 so that the channels 3, 4 are deeper than the thermal element 2 and the thermal element 2 is thus fully accommodated in the channels 3, 4. The thermal element 2 thus lies underneath the upper surface of the mat 1 and is protected from footfall on top of the mat 1.

As can best be seen in FIG. 2, the channels 3, 4 are undulating in the sense that the constrictions that form each channel 3, 4 are not all perfectly in line, but rather are offset alternately in opposite directions when viewed along the length of the channel 3, 4. Therefore a thermal element 2 laid in the channel 3, 4 undulates back and forth across a mid-line of the channel 3, 4 as it is deflected by the projections 5 on either side of the channel 3, 4. This undulation allows the thermal element 2 to be held in contact with the side walls 6 of a number of the projections 5, but without being pinched between them and without requiring overhanging lips to hold the thermal element 2 in the channel 3, 4. Instead, the channel 3, 4 can be formed to be wider than the diameter of the thermal element 2, thus avoiding pinching, while still ensuring that the thermal element 2 is contacted on both sides thereby holding it securely within the channel 3, 4. Without such grip on both sides there is a risk that the thermal element 2 could pop out of the channel 3, 4 which is inconvenient as it requires relaying of the thermal element 2 and also risks damage to the thermal element 2 underfoot while not protected in a channel 3, 4.

For added security, i.e. for better retention of the thermal element 2 within the channel 3, 4, it is preferred that a small recess 7 is provided on the projections 5 at the point of contact with the thermal element 2. This recess ensures that as the thermal element 2 is diverted around the projection 5, it sits in the recess 7 and is thus retained from above by a part of the projection 5 that overlies the thermal element 2. Note however that as this recess 7 is only ever present on one side of the channel 3, 4 at one time and as the channel 3, 4 is wider than the thermal element 2, the thermal element 2 is not pinched as it is pressed down into the channel 3, 4 and thus does not suffer any potential damage during this process.

The portion of the thermal element 2 that lies in channel 4a in FIG. 2 is caused to undulate by three projections 5 which have been labeled A, B, and C in FIG. 2. The projections A and C lie on one side of the thermal element 2, deflecting it in one direction (towards the top of the page), while projection B lies on the opposite side of the thermal element 2, deflecting it in the opposite direction (towards the bottom of the page). Therefore, with reference to the page of FIG. 2, the thermal element undulates from left to right over projection A, under projection B and over projection C. The contact points of the projections A, C interleave with that of projection B (and others further along the path of the channel 4a) along the length of the thermal element 2. It can be appreciated from this illustration that the outer radius of each projection A, B, C, forms the inner radius of the undulations of thermal element 2 placed in channel 4a. The outer radius of the thermal element 2 does not make contact with the projections that are adjacent to it (best seen in FIG. 3).

As can be seen in FIGS. 1 and 2, two sets of undulating channels 3, 4 are formed the first set 3 is perpendicular to the second set 4. The first set of channels 3 comprises a number of substantially parallel channels, e.g., 3a, 3b. Similarly, the second set of channels 4 comprises a number of substantially parallel channels, e.g., 4a, 4b. The term "substantially" here allows for the fact that adjacent channels in a set or not exactly parallel. For example, in the design of FIGS. 1-3, the undulations in two adjacent channels 3a, 3b are a mirror image of each other such that they undulate towards and away from each other as they pass along the length of the mat, i.e. there are points in adjacent channels that are closer together than other points in the same adjacent channels. Thus the adjacent channels 3a, 3b (and also 4a, 4b) are not exactly parallel.

The projections 5 are arranged in pairs. For example projections 5a and 5b form a pair. Each pair of projections 5 lies between two adjacent channels of the first set of channels 3 and also between two adjacent channels of the second set of channels 4. Each projection 5 of the pair forms a contact point on a channel 3, 4 such that the two projections 5 of the pair form contact points on adjacent channels 3, 4 of one set of channels, but not both. Thus if a pair of projections 5 form contact points on a channel of the first set 3, they do not form contact points on a channel of the second set 4 and vice versa. Recesses 7 are formed at these contact points as discussed above.

The two projections 5 of a pair are curved such that each forms an arc around a central region 9. The two projections 5 of each pair are separated from each other so as to form a pathway 25 into the central region 9. These pathways 25 allow heat to be conducted from the thermal element 2 more evenly across the surface of the mat 1 as a whole, avoiding cold spots that might otherwise be formed between channels 3, 4. The curved nature of the projections 5 allows them to guide the thermal element smoothly between channels 3 of one set and channels 4 of the perpendicular set, thus allowing changes of direction of the thermal element 2 so that it can be laid back and forth across the mat 1 to cover a whole floor.

The undulations caused by the projections 5 do not cause a thermal element 2 placed within the channel 3, 4 to deviate by more than the width of the thermal element 2. This puts a restriction on the amplitude of the undulations so as to minimize the stress placed on the thermal element 2, while also minimizing the increase in length of thermal element 2 that is required by the undulations but also ensuring that the thermal element 2 is still securely held in place.

As can best be seen in FIGS. 1 and 2, the projections 5 can be arranged into pairs in two different orientations so that one orientation provides contact points with one set of channels 3, while the other orientation provides contact points with the other set of channels 4. The projections 5 are arranged such that these two orientations are interleaved like the squares of a chequerboard, e.g., with one orientation occupying the black squares and the other orientation occupying the white squares. Thus each pair is directly adjacent (on the opposite side of a single channel) to a pair of the other orientation.

Figure 4A:
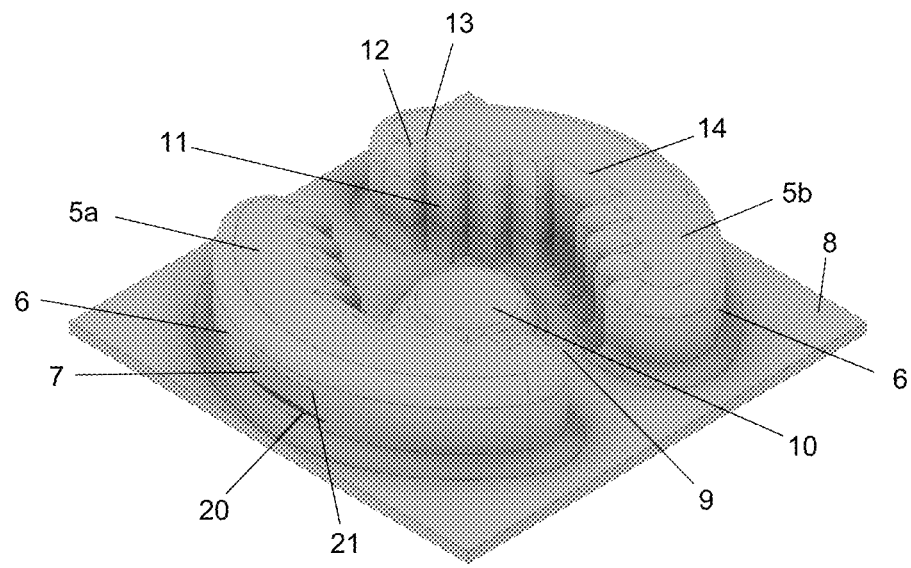
FIGS. 4a and 4b show a pair of projections enlarged.

FIG. 4a shows a pair of projections 5a, 5b in greater detail. Each projection 5a, 5b is of generally curved shape, i.e. in the shape of a "C" or a parenthesis. The pair of projections 5a, 5b is formed from two such projections with the open parts facing each other such that the pair is formed from an opening parenthesis 5a and a closing parenthesis 5b. In the central region 9 between the two projections 5a, 5b of the pair, an additional projection 10 is provided. This projection primarily serves as a visual indicator that the path between the two projections 5a, 5b is not intended for placement of thermal elements 2.

Each projection 5a, 5b may be considered to have an outer wall 6 and an inner wall 11. The inner walls 11 face the central region 9 and projection 10 while the outer walls 6 provide the contact surface for the thermal elements and thus form the channels 3, 4 as described above. The recess 7 is formed in the outer wall 6. As can be seen in FIG. 4a, the recess 7 in this embodiment has a generally rectangular shape with sharp (square) edges 20, 21 forming its lower and upper edges (respectively closer to and further from the base 8). The recess 7 serves to retain a thermal element 2 which is laid within the adjacent channel 3, 4 by accommodating a portion of the thermal element 2 within the recess as the thermal element is bent round and against the outer wall 6 of the projection 5a. With the thermal element 2 partially seated within the recess 7, the upper edge 21 of the recess (and thus the upper portion of the projection 5a) partially overlaps the thermal element 2, thus resisting upward movement of the thermal element 2 and thus retaining the thermal element 2 securely in the support structure 1. Details of the recess 7 are further discussed below.

Also shown in FIG. 4a is the oscillating form of the inner wall 11. In this example, the inner wall 11 is formed with a concertina shape such that the wall oscillates back and forth first in one direction, then in another direction. In other words, the wall 11 changes directions repeatedly along its length such that following the wall involves taking alternating left and right turns. The shape of the wall is best seen in the top view of FIG. 4b. In this particular example, the wall shape is formed from two separate concertinas that join in the middle, thereby forming the curved inner wall 11. For example, starting at the right hand side of the inner wall 11 of projection 5a in FIG. 4b and moving towards the left of the figure, the wall 11 begins heading towards the left of the diagram (i.e. parallel to the channel 3). The wall 11 then turns left, forming a corner 12 that faces the central region 9. The wall then turns right, forming a recessed corner 13. This zigzag form is then repeated three more times to arrive at the middle 14 of the inner wall 11. Here the wall 11 changes direction on a larger scale by taking two right turns in a row (indicated at the two recessed corners 15 and 16) before once again taking a zigzag/concertina approach of alternating left and right turns (three more of each), before a final left turn to end up parallel to the channel 3 again at the left side of the figure. In total, the wall 11 makes 16 turns (i.e. 16 changes of direction). The folded or concertina shape of the wall 11 increases the strength of the wall 11 to crushing from above, i.e. it is better able to resist forces that press down on the structure 1 during installation, such as the weight of an installer kneeling on the structure 1 or tools placed on the structure 1. The changes of direction in the wall 11 give the wall 11 an effective thickness that extends from the recessed corners 13 to the projecting corners 12 without the material cost of having a wall of that thickness. It will be appreciated that in this example the changes of direction are all right angle turns, i.e. 90 degree changes of direction, but this need not be the case. In other examples, the changes of direction may be shallower (e.g., down to about 60 degrees) or tighter (up to about 120 degrees). Further, the turns do not all have to take the same angle and do not have to alternate strictly (for example a square wave pattern is equally viable). Further, while it is preferred that the turns are sharp, a smoothly oscillating wall 11 (e.g., a sinusoidally oscillating wall) still provides the benefits of increased effective thickness and crush resistance.

Figure 4B:
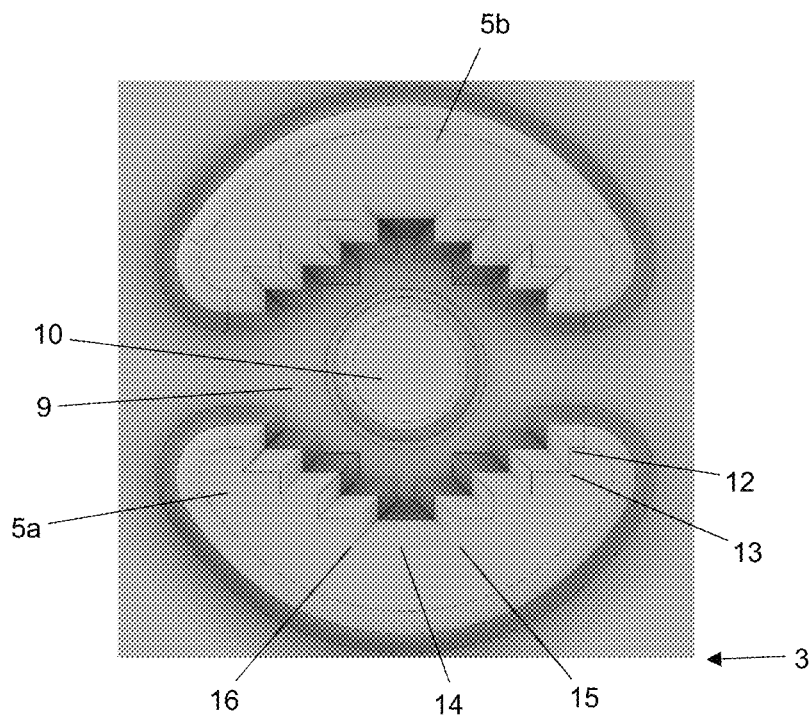

The projection 5b in FIGS. 4a and 4b has the same shape of inner wall 11, but in mirror image, thus providing the same benefits. It will be appreciated that the two projections 5a, 5b do not have to have the same shape of inner wall 11.

The outer wall 6, in contrast to the inner wall 11, is substantially smooth, i.e. it does not have an oscillating or concertina form. Such a form (i.e. a concertina form) is possible for the outer wall (or portions of the outer wall 6) and would add further strength and crush resistance, but a smooth outer wall 6 is preferred in this embodiment as it provides a smoother surface for contact with the thermal element 2 and also adds to the visual differentiation, making it easier to see the channels 3, 4 where the thermal element (s) 2 are to be placed.

Figure 5A:
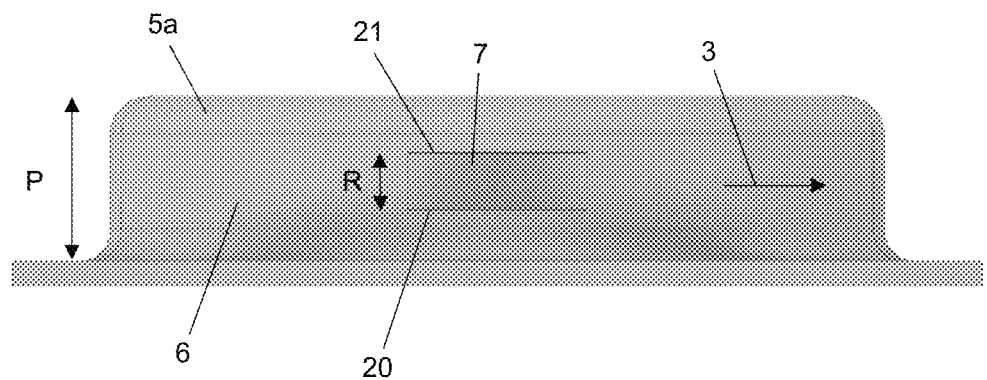
FIGS. 5a and 5b show side views of a pair of projections.
Figure 5B:
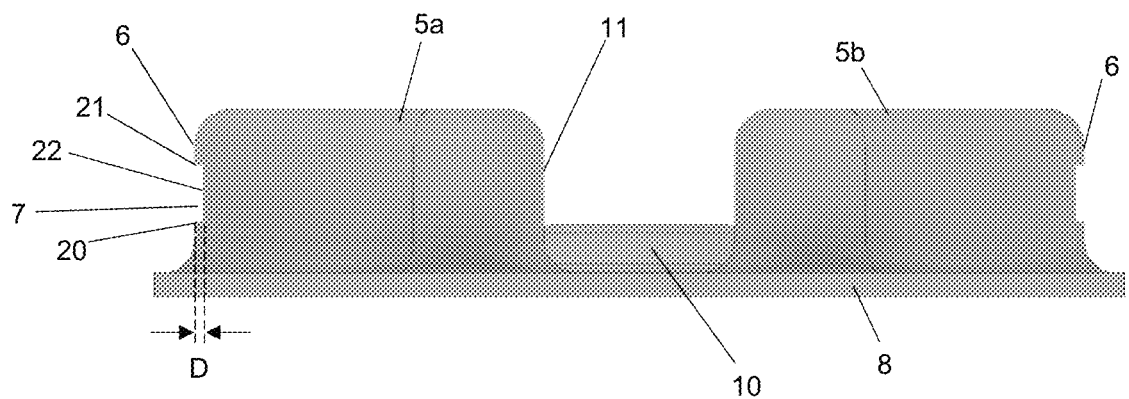

FIGS. 5a and 5b show side views of the pair of projections 5a, 5b and show the recess 7 in more detail. FIG. 5a shows a side view of the projection 5a showing the outer wall 6 with the recess 7 formed in the middle thereof, i.e. at the point closest to the channel 3 so that the recess 7 provides the contact portion for a thermal element 2 placed within the channel 3. The recess 7 is of rectangular shape with its lower edge 20 and upper edge 21 both lying parallel to the channel 3 and being separated by the recess height R. As can be seen in FIG. 5a, the recess height R is less than half of the projection height P (and in fact is about 40% of the projection height P in this particular example). The projection height P is slightly larger than the expected diameter of the thermal elements 2 for which the structure 1 is designed so that the thermal element(s) 2 can lie wholly within the channels 3, 4 without projecting above the upper surface of the projections 5. This provides a degree of protection to the thermal elements 2. The recess 7 is approximately centered vertically on the outer wall 6. The recess 7 is actually ideally centered with respect to the thermal element 2 which will normally rest on the base 8 of the support 1 and therefore the recess 7 may be situated slightly below center on the outer wall 6 of the projection 5 (i.e. closer to the base 8). However, in this example, as the projections 5 are only slightly larger than the diameter of the thermal element, this off-centering is not particularly discernible. In other examples the thermal element 2 may be held slightly off the base 8 by being located in the recess 7. As is shown in FIG. 5*b*, the recess 7 has a depth D between the outer surface of the outer wall 6 and the rear wall 22 of the recess 7. The depth D is large enough to ensure that the thermal element 2 does not come into contact with the rear wall 22 when it is fully engaged with the upper edge 22 and lower edge 21 of the recess 7. Thus the locating of the thermal element 2 in the recess 7 is governed by the positioning and the height R of the recess 7. The depth D is chosen to accommodate a slightly undersized thermal element 2 in case of slight manufacturing variations. For example the depth D can be chosen to accommodate a thermal element 2 up to 10% smaller than the design size while still not touching the rear wall 22. In this way, the locating feel and security of the thermal element 2 within the recess is ensured. The "locating feel" is the physical feedback that the user receives when the thermal element 2 locates into the recess 7, i.e. a slight click. This lets the installer know that the thermal element 2 has correctly located into the recess 7.

Figure 6:
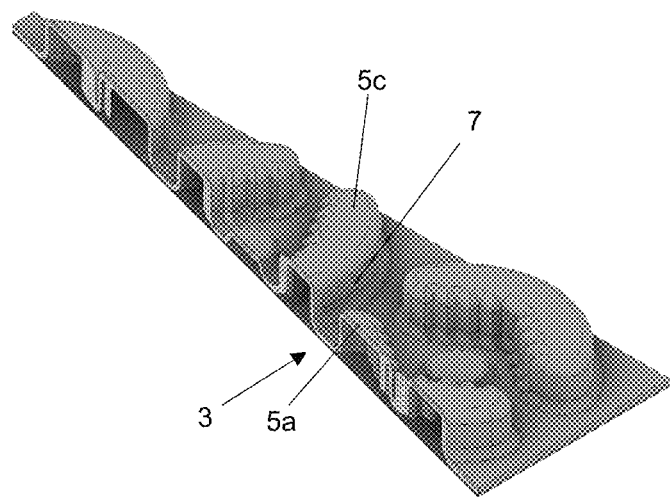
FIG. 6 shows a cross-section through the structure.

FIG. 6 shows a cross-section taken through the smallest gap of the channel 3, i.e. the point in the channel 3 where the projection 5*a* is closest to an opposing projection 5*c* on the opposite side of the channel 3. As can be seen, here the recess 7 is located away from this narrowest gap. The narrowest gap is still wider than the thermal element 2 so that there is no pinching or squeezing of the thermal element during installation. The locating of the thermal element 2 in the recess 7 only then occurs as the thermal element 2 is wrapped slightly around the outer wall 6 due to the undulations of the channel 3, thus causing the thermal element 2 to seat within the recess 7, thus holding the thermal element 2 in place without any pinching or squeezing that could damage the thermal element 2.

Figure 7:
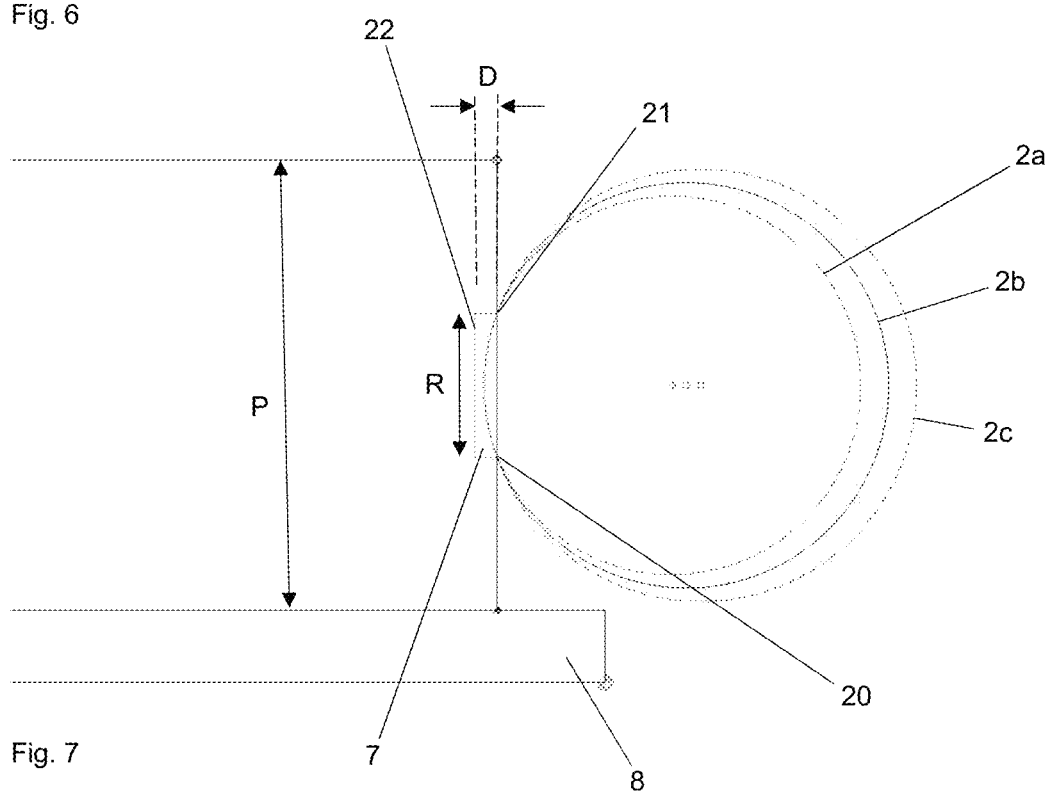
FIG. 7 shows a close-up of a recess in a side wall.

FIG. 7 illustrates the fitting of the thermal element 2 into the recess 7, including variations in size of the thermal element 2. Three different diameter thermal elements 2*a*, 2*b*, 2*c* are shown in FIG. 7. In this example the thermal elements 2*a*-2*c* are heating wires with a design diameter of 4.5 mm. The projection height P is 5.2 mm. The thermal element 2*b* is the correct diameter, i.e. 4.5 mm. The thermal element 2*a* is smaller than the design size by 0.5 mm, i.e. it has a diameter of 4 mm. The thermal element 2*c* is larger than the design size by 0.5 mm, i.e. it has a diameter of 5 mm. As the projection height P is 5.2 mm it remains higher than this possible larger thermal element 2*c*. For each of these thermal elements 2*a*, 2*b*, 2*c*, the circumference of the thermal element 2*a*, 2*b*, 2*c* contacts both of the upper edge 21 and the lower edge 20 of the recess 7, thus locating the thermal element 2*a*, 2*b*, 2*c* firmly against the projection 5 with some overlap in the recess 7 such that the thermal element 2*a*, 2*b*, 2*c* cannot simply 'pop' out of place. As can also clearly be seen in this cross-section, the different diameter thermal elements 2*a*, 2*b*, 2*c* extend into the recess 7 by different amounts, but the depth D of the recess 7 is greater than the deepest of them. Thus the smallest diameter thermal element 2*a* (which extends deepest into the recess 7) still does not contact the rear wall 22 of the recess 7 and thus the rear wall 22 does not interfere with the locating of the thermal element 2*a* against both the lower edge 20 and the upper edge 21 of the recess 7.

Figure 8A:
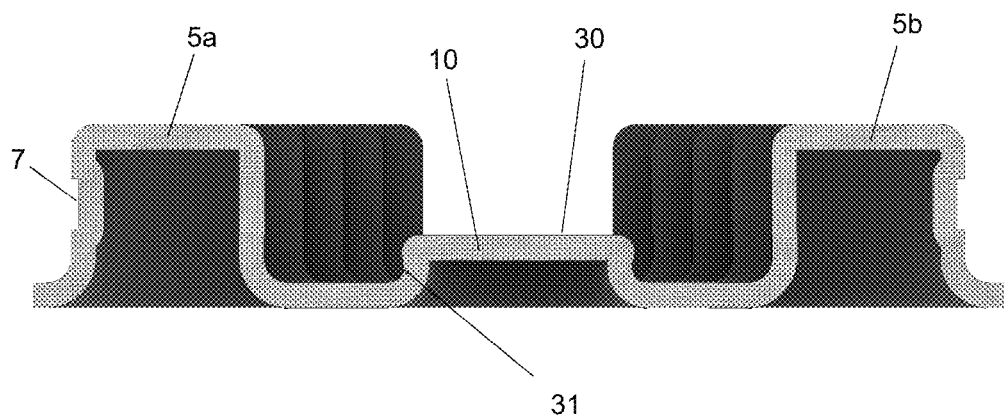
FIGS. 8a and 8b show an example of an interlock projection.
Figure 8B:
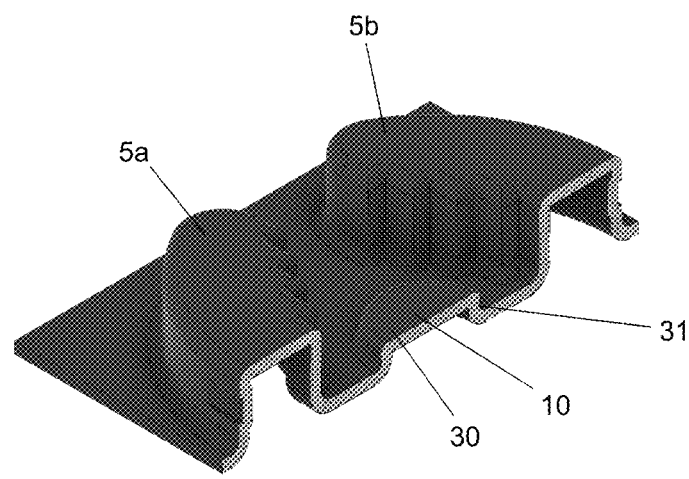

FIGS. 8*a* and 8*b* show a different form of central projection 10 in the central region 9 of a pair of projections 5*a*, 5*b*. In this embodiment, the projection 10 differs from that shown in FIGS. 4*a* and 4*b* in that instead of sloping up from the base 8 towards its top surface 30, the projection 10 in FIGS. 8*a* and 8*b* has an overhanging outer wall 31. The overhanging outer wall 31 creates a vertical overlap with the base 8 and forms a vertically concave perimeter round the projection 10, facing the inner walls 11 of the projections 5*a*, 5*b*. The overhanging outer wall 31 provides a mechanical interlock with the tile adhesive which is poured over the support structure 1 after installation of the thermal element 2. Once dried and set, separation of the tile adhesive from the support structure constitutes a failure of the heating system and thus should be avoided. The mechanical interlock provided by the overhanging wall creates a much stronger interlock between the adhesive and the support structure 1, making separation much less likely. In particular, the concave shape of the wall 31 means that the adhesive will flow slightly underneath the upper surface 30 of the projection 10, thus forming a constricting ring (once set) around the narrow waist of the projection 10 (the smallest diameter part of the projection) which cannot easily pass over the larger upper surface 30 of the projection 10.

Figure 9A:
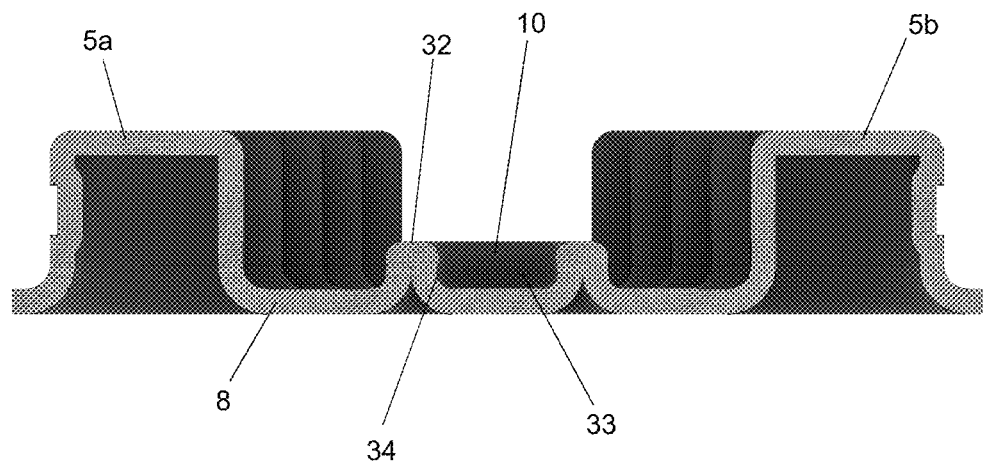
FIGS. 9a and 9b show another example of an interlock projection.
Figure 9B:
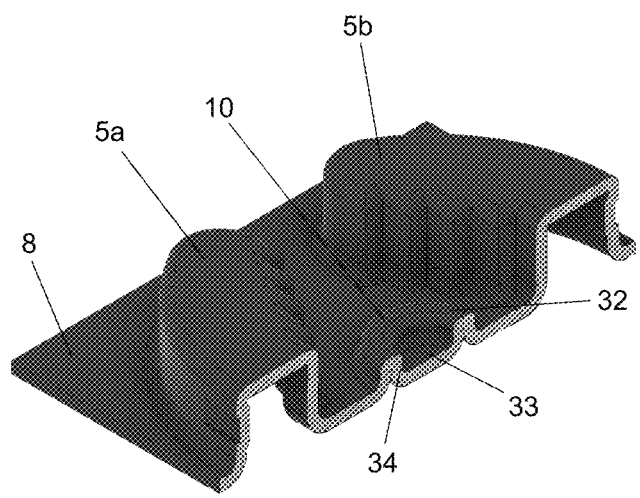

FIGS. 9*a* and 9*b* show a variation on the idea of FIGS. 8*a* and 8*b*, but instead of the overhanging wall being on the outside of the projection 10, the projection 10 is formed as a ring 32 with a depression or hollow 33 in the middle. The ring 32 has an inner wall 34 which faces the hollow 33 and which overhangs the base 8 (in the middle of the hollow 33). The inner wall 34 is thus vertically concave and provides the same mechanical interlock benefits as described above in relation to FIGS. 8*a* and 8*b*.

Figure 10A:
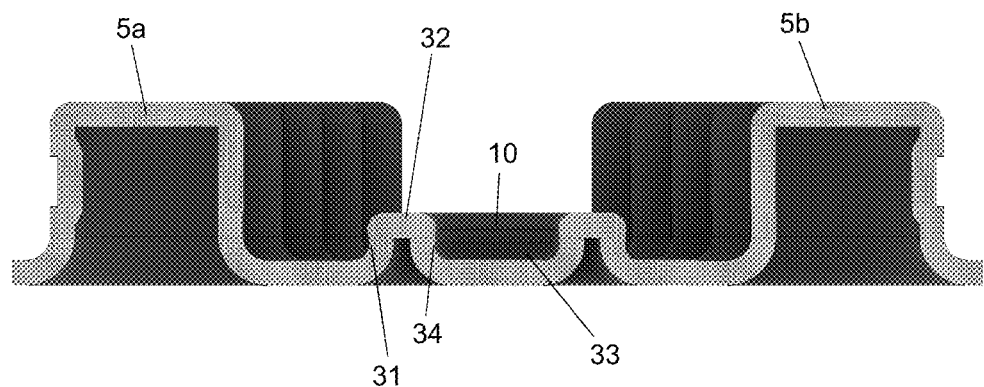
FIGS. 10a and 10b show another example of an interlock projection.
Figure 10B:
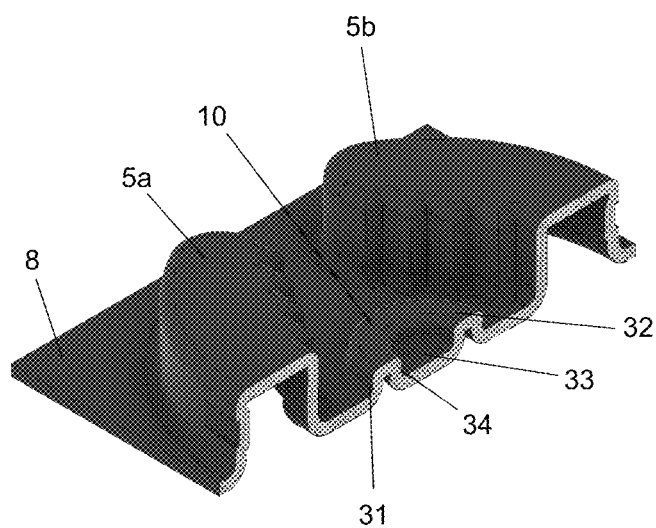

FIGS. 10*a* and 10*b* show another alternative projection which essentially combines the ideas of FIGS. 8*a*, 8*b*, 9*a* and 9*b* such that the projection 10 is formed as a ring 32 with both a concave inner wall 34 and a concave outer wall 31. A mechanical interlock is thus provided on both the inside and the outside of the ring 32 for increased interlock of the support structure 1 with the adhesive layer.

Figure 11A:
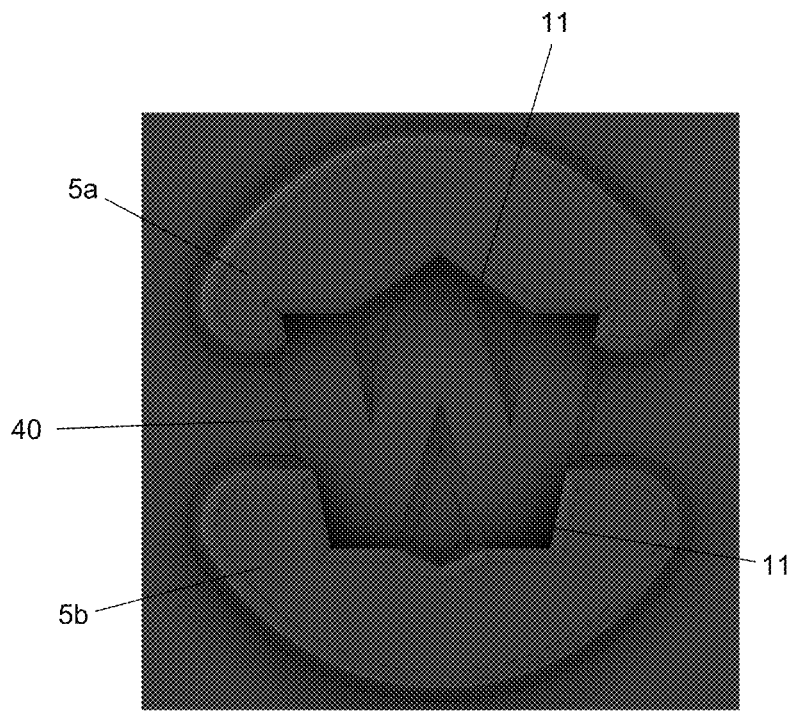
FIGS. 11a and 11b show a pair of projections with irregular walls.
Figure 11B:
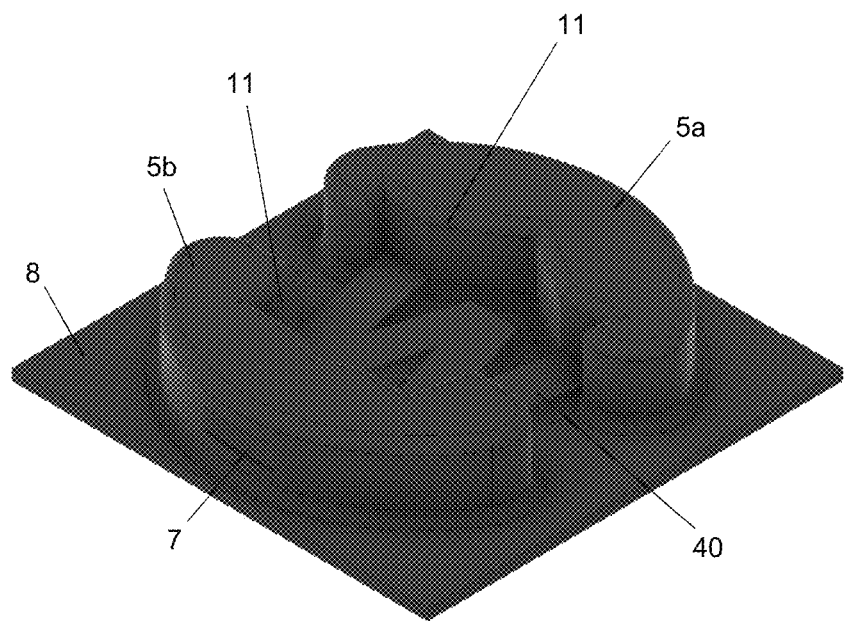

FIGS. 11*a* and 11*b* illustrate another embodiment of a pair of projections 5*a*, 5*b* of the support structure 1 in which the angles of the changes of direction in the oscillating wall 11 are not uniform and in which the distances between those changes of direction are also not uniform. Additionally, the wall 11 of the projection 5*b* is not the same shape as the wall 11 of the projection 5*a*. The reasons for such asymmetries may be many and varied, but in this particular embodiment, one advantage is that the shape allows a branding detail 40 to be included between the projections 5*a*, 5*b*.

Figure 12A:
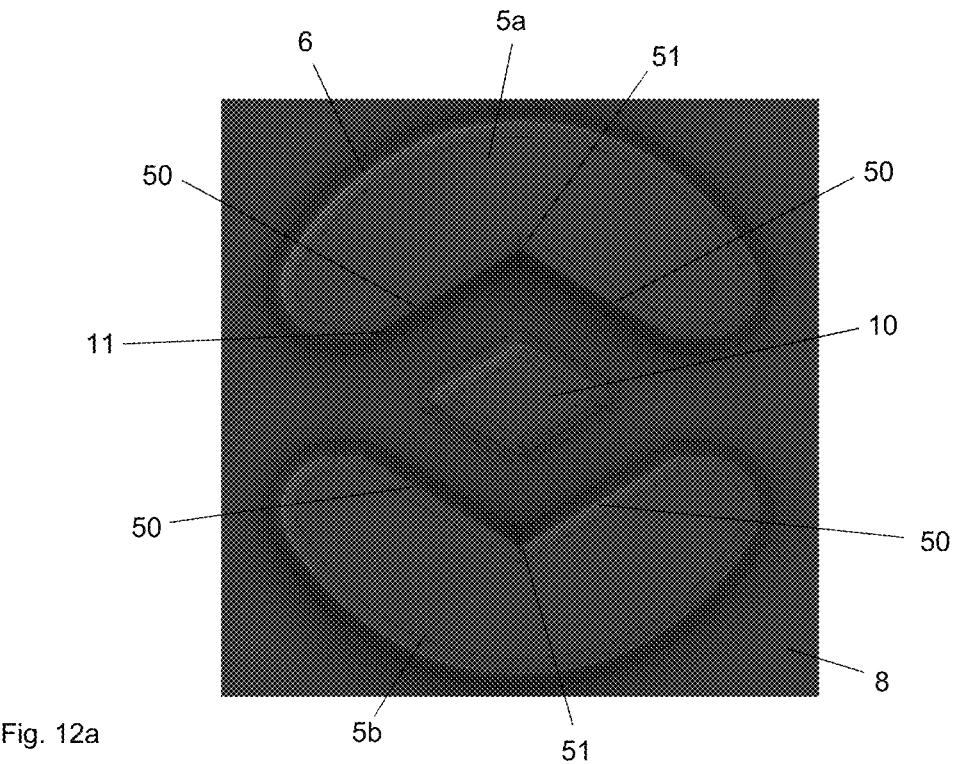
FIGS. 12a and 12b show a pair of projections with straight inside walls.
Figure 12B:
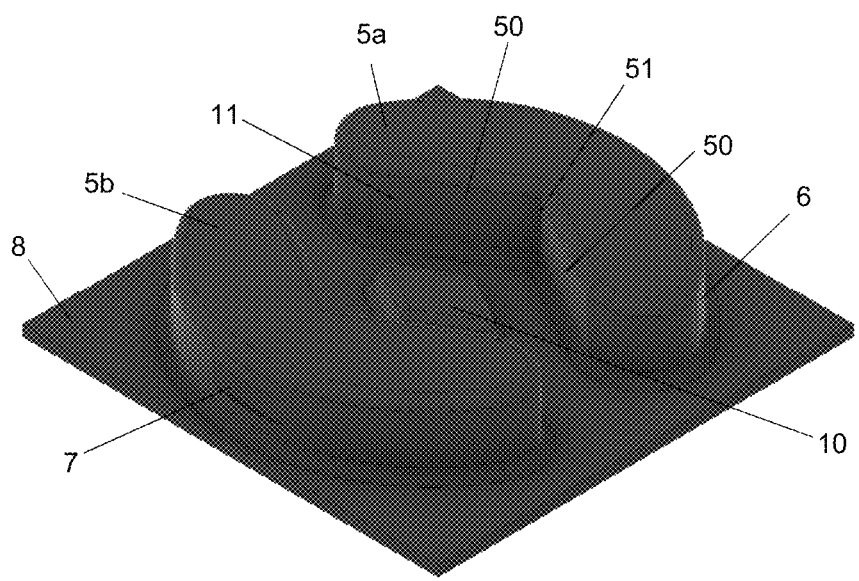

FIGS. 12*a* and 12*b* illustrate another embodiment of a pair of projections 5*a*, 5*b* of the support structure 1 in which the oscillating inner wall 11 of each projection 5*a*, 5*b* comprises only a single oscillation (in this case comprising three changes of direction in total). Each projection 5*a*, 5*b* in this embodiment has a smoothly curved outer wall 6, while the inner wall 11 consists of two straight walls 50 meeting at a corner 51. Thus the two straight walls 50 and corner 51 form a concave inner wall 11, while the outer convex wall 6 is smoothly curved.

The projection 10 in the central region 9 of FIGS. 12*a* and 12*b* is shaped with straight edges to match the straight walls 50 of the projections 5*a*, 5*b*, but a circular (or other shaped)

projection 10 could equally be used here. Similarly, the projection 10 shown in FIGS. 12a and 12b could be used in the other embodiments.

Other features of the design of FIGS. 12a and 12b such as the recess 7 and the possibility of mechanical interlocks in the inside and/or outside of the projection 10 are as described above.

It will be appreciated that other variations and modifications may be made to the examples described above while still falling within the scope of the appended claims.

The invention claimed is:

1. A support structure for a heating and/or cooling system, comprising:
a base; and
a plurality of projection pairs extending from said base, each of the plurality of projection pairs comprising a pair of projections having substantially equal height and separated from each other by a gap, each of the projections in the pair having an overall curved shape and comprising:
a concave inner surface extending upwardly from and substantially perpendicularly to the base, and
a convex outer surface extending upwardly from the base;
wherein at least part of the concave inner surface of each projection in each pair of projections has an oscillating form that increases an effective thickness of the concave inner surface;
wherein the concave inner surfaces of the projections in each pair of projections define a central region therebetween having a height lower than the height of each projection in the pair;
wherein the plurality of projection pairs are positioned on the base so that the convex outer surfaces of the projections in the projection pairs form a plurality of generally parallel, undulating channels configured to retain one or more thermal elements on the base; and
wherein the oscillating form comprises at least four steps.

2. A support structure as claimed in claim 1, wherein the oscillating form comprises a sequence of changes of direction.

3. A support structure as claimed in claim 2, wherein the oscillating form comprises a sequence of alternating directions.

4. A support structure as claimed in claim 2, wherein the sequence comprises at least four changes in direction.

5. A support structure as claimed in claim 2, wherein the changes of direction occur at sharp corners.

6. A support structure as claimed in claim 2, wherein each change of direction is at least 60 degrees.

7. A support structure as claimed in claim 2, wherein each change of direction is no more than 120 degrees.

8. A support structure as claimed in claim 1, wherein the convex outer surface is smooth.

9. A support structure as claimed in claim 1, wherein the at least four steps form a sequence of alternating directions of between 80 to 100 degrees.

10. A support structure as claimed in claim 1, wherein the plurality of generally parallel, undulating channels are formed by positioning the plurality of projection pairs in a chequerboard pattern on the base, such that each of the plurality of projection pairs has a perpendicular orientation to an adjacent projection pair.

11. A support structure as claimed in claim 1, further comprising the one or more thermal elements;
wherein each of the plurality of generally parallel, undulating channels undulates with an amplitude that is less than a width of the one or more thermal elements.

12. A support structure as claimed in claim 1, wherein the convex outer surface comprises a recess configured to retain a particular one of the one or more thermal elements.

13. A heating and/or cooling system comprising:
one or more thermal elements; and
a support structure comprising:
a base, and
a plurality of projection pairs extending from the base, each of the plurality of projection pairs comprising a pair of projections having substantially equal height and separated from each other by a gap, each of the projections in the pair having an overall curved shape and comprising:
a concave inner surface extending upwardly from and substantially perpendicularly to the base, and
a convex outer surface extending upwardly from the base;
wherein the concave inner surfaces of the projections in each pair of projections define a central region therebetween having a height lower than the height of each projection in the pair;
wherein the plurality of projection pairs are positioned on the base so that the convex outer surfaces of the projections in the projection pairs form a plurality of generally parallel, undulating channels configured to retain the one or more thermal elements on the base;
wherein at least part of the concave inner surface of each projection in each pair of projections has an oscillating form that increases an effective thickness of the concave inner surface; and
wherein the oscillating form comprises at least four steps.

14. The heating and/or cooling system of claim 13, wherein the at least four steps form a sequence of alternating directions of between 80 to 100 degrees.

15. The heating and/or cooling system of claim 13, wherein the oscillating form comprises a smooth undulating form.

16. The heating and/or cooling system of claim 13, wherein the plurality of generally parallel, undulating channels are formed by positioning the plurality of projection pairs in a chequerboard pattern on the base, such that each of the plurality of projection pairs has a perpendicular orientation to an adjacent projection pair.

17. The heating and/or cooling system of claim 13, wherein each of the plurality of generally parallel, undulating channels undulates with an amplitude that is less than a width of the one or more thermal elements.

18. A method of installing a heating and/or cooling system, comprising:
forming a plurality of generally parallel, undulating channels on a base for one or more thermal elements by positioning a plurality of projection pairs on the base; and
positioning the one or more thermal elements in the plurality of generally parallel, undulating channels;
wherein each of the plurality of projection pairs comprises a pair of projections having substantially equal height and separated from each other by a gap, each of the projections in the pair having an overall curved shape and comprising:
a concave inner surface extending upwardly from and substantially perpendicularly to the base, and
a convex outer surface extending upwardly from the base;

wherein the plurality of generally parallel, undulating channels are formed by the convex outer surfaces of the projections in the plurality of projection pairs;

wherein at least part of the concave inner surface of each projection in each pair of projections has an oscillating form that increases an effective thickness of the concave inner surface; and wherein the oscillating form comprises at least four steps.

\* \* \* \* \*